Jan. 24, 1961   G. T. RANDOL   2,969,052
AUXILIARY DISENGAGING MECHANISM FOR AUTOMOTIVE CLUTCHES
Original Filed Oct. 28, 1957   5 Sheets-Sheet 2

Inventor

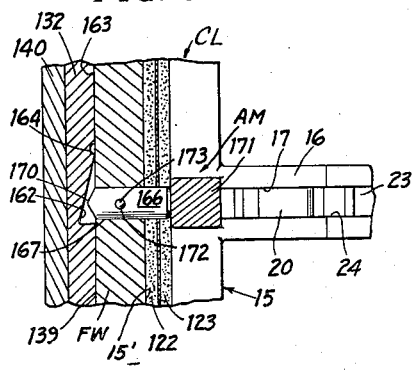
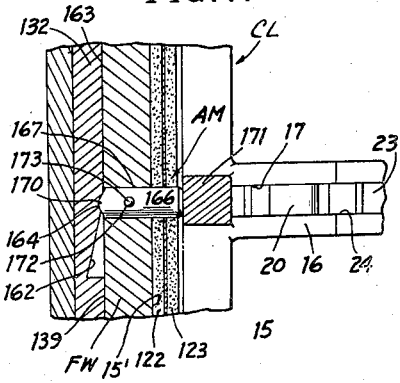
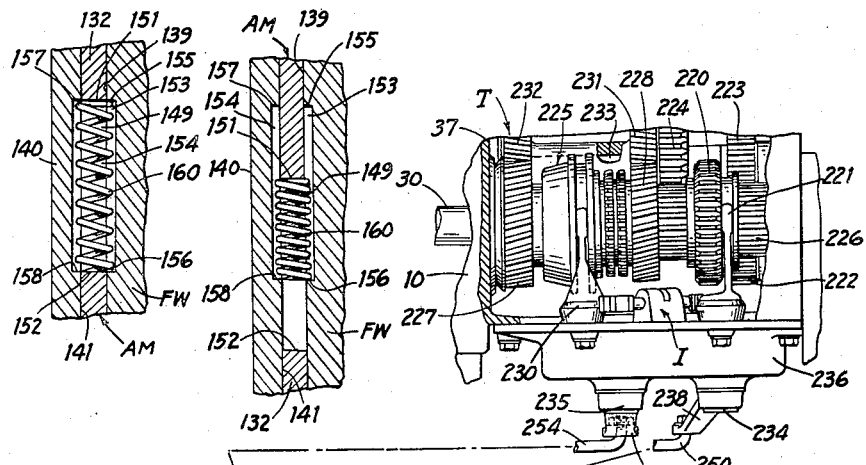
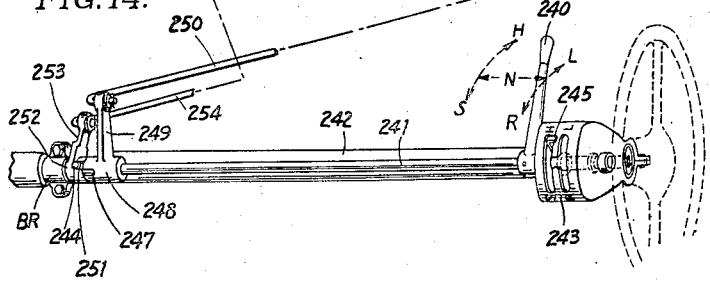

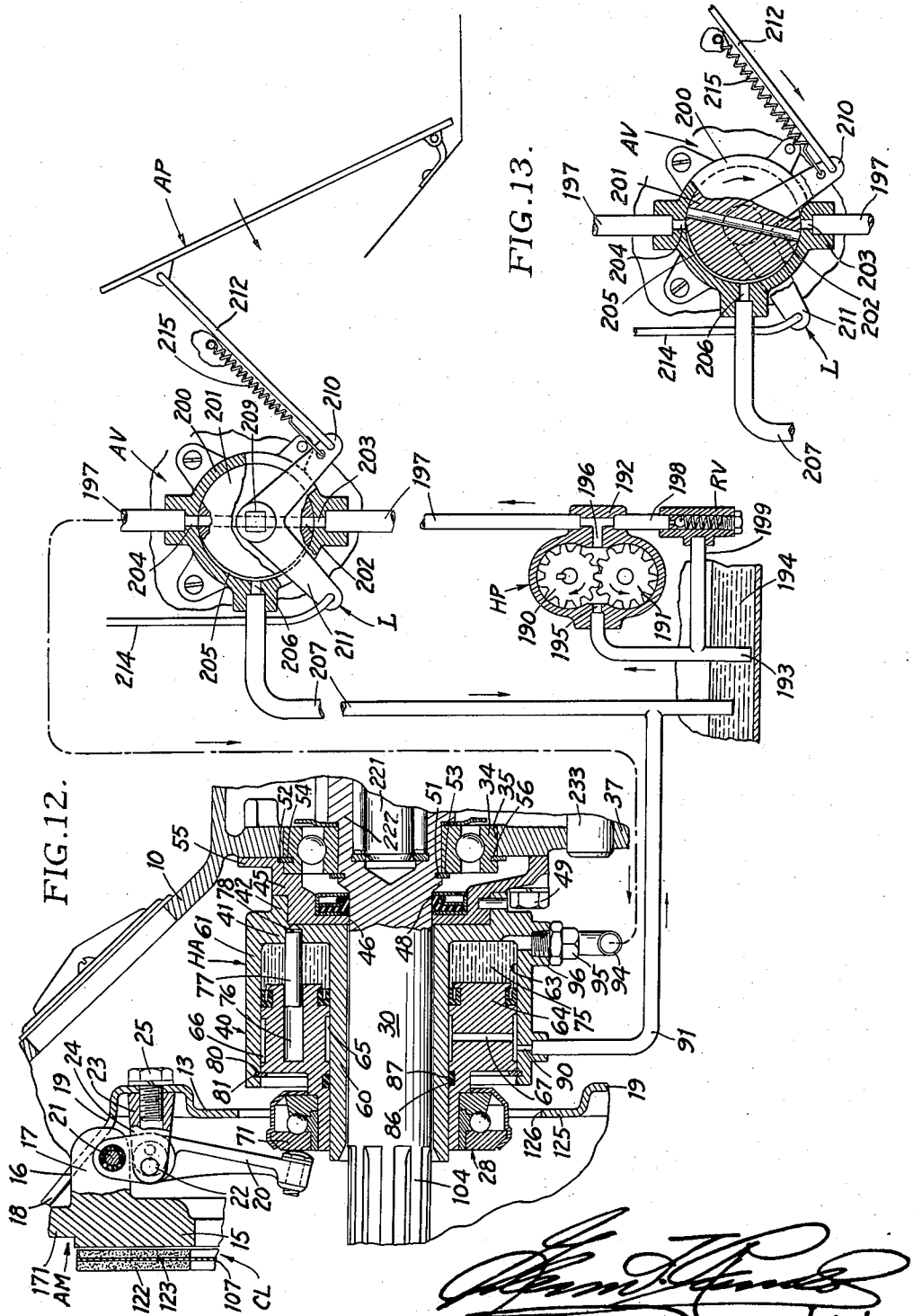

United States Patent Office

2,969,052
Patented Jan. 24, 1961

2,969,052

AUXILIARY DISENGAGING MECHANISM FOR AUTOMOTIVE CLUTCHES

Glenn T. Randol, Second and Paul St., Box 53, Mountain Lake Park, Md.

Continuation of application Ser. No. 692,911, Oct. 28, 1957. This application Jan. 15, 1960, Ser. No. 2,787

26 Claims. (Cl. 123—179)

This application is a continuation of my prior copending application Serial No. 692,911 filed October 28, 1957, now abandoned.

The present invention relates generally to power-controlled torque transmitting mechanism, and more particularly to power-controlled friction clutches of the spring-engageable type commonly provided in autoclave vehicles and the like for coupling the engine to an associated manually and/or power-shifted change-speed gearing, although other uses are obviously feasible.

The present invention aims as a primary object, to provide new and improved means whereby action of manually-shifted or power-shifted change-speed transmissions is facilitated without using a clutch pedal or the use of any special or non-standard control devices and, in fact, with the use of no control devices other than the conventional control devices such as the gear-shift or selector lever and accelerator pedal mechanism, commonly provided on motor vehicles having manually-shifted transmissions. In the case of power-shifted transmissions, a speed sensitive device is employed with the driver retaining supervisory control over the shifting action. This latter type of transmission is sometimes referred to as "semi-automatic," as distinguished from fully automatic transmissions wherein gear ratio changing is not under the direct control of the driver.

Thus, as indicated, a motor vehicle equipped with my new and improved controlling system may incorporate a conventional accelerator pedal and a conventional hand shift-lever with their respective mechanical linkages mounted, for example, on the toe board and steering column respectively in the driver's compartment, and movable in a conventional pattern, the improved controlling system of the present invention being so interrelated with such conventional control members that the change-speed shifting may be controlled or supervised without the necessity for any unusual movements of such controls and without manipulating a clutch pedal or any other control means whatever.

In the art of power-actuated friction clutches, and particularly relating to automotive installations, the problem of dispensing with the conventional clutch pedal and its correlation with gear shifting, has received considerable attention. The art is replete with many types of power-controlled mechanisms adapted to automatically disengage the clutch and accommodate its re-engagement under supervision of the driver as through the instrumentality of the accelerator mechanism operating in an engine-accelerating direction to induce such re-engagement, but none which would enable restarting of the engine by operating the usual starter switch in the event of power disengaging failure or stalling of the engine while the selective change-speed transmission is "in-gear" under torque-load from the roll of the vehicle induced, for example, by the gradient on which the vehicle may happen to be with its brakes released. In such a situation, the driver is unable to restart the engine by operating the usual starter switch since neutralizing of the gearing to release the engine by operating the shift-lever, which actually under such conditions is locked "in-gear," is prohibited thus rendering the vehicle inoperative. The only alternative is to have a "push-start" with likely damage to the vehicle and the embarrassment and inconvenience of depending on other drivers on the road willing to accommodate by pushing such a disabled car to get it off the "hook" so to speak.

My invention, therefore, seeks to advance the art by providing a novel and improved power-controlled friction clutch that will efficiently transmit driving torque to an associated change-speed transmission; that will facilitate manual gear-changing; that will enable smooth starting of the vehicle; and that will automatically disengage to enable restarting the engine despite coasting load on the engine resulting from "roll" of the vehicle following engine-stall, as when starting the vehicle, or while the vehicle is parked "in-gear" with the clutch and gearing in engaged condition with the vehicle brakes off.

An object importantly related to the object immediately preceding is the provision of new and novel auxiliary disengaging mechanism actuated by the conventional electric starter for the engine when the clutch is under torque load prior to the starter becoming effective to turn the engine upon its release by said mechanism, whereby energization of the engine starter as by closing the starter switch conveniently installed on either the floorboard or instrument panel in the driver's compartment, and in some installations operated by an abnormal movement of the ignition switch or accelerator pedal, initially effects separation of the clutch friction members to release the engine for subsequent relative rotation to restart the same in the usual manner and thereby restore power control to the clutch where the fluid actuating force for the clutch is generated by operation of the engine, such as, for example, vacuum or hydraulic pressure. Upon the engine being started as aforesaid, the auxiliary disengaging means automatically reset to a non-interfering disposition with respect to normal power-control therefor.

An important object related to the object immediately above is the provision of an auxiliary clutch disengaging mechanism of the type referred to which is responsive to the engine starter to first disengage the clutch members and then rotate the engine flywheel to start the engine, whereupon the power actuator for the clutch is energized to take over control of the re-engaging and disengaging action of the clutch under control, for example, of an associated speed-sensitive device, accelerator mechanism, and shift-lever, the interaction between these three principal controls provides the control system for the clutch actuator.

Another object is to provide an engine starter actuated clutch disengager which requires no special manipulation of the driver controls nor change of driving habits normal to operating such controls as would be the normal reaction in the case of an "engine-stall" to touch the starter button or lever which, in the present instance, would automatically restart the engine even though the clutch may be torque loaded due to coasting drive or roll of the vehicle while "in-gear."

In a more specific sense the present novel auxiliary disengaging mechanism comprises: a spring-loaded ring gear relatively movable predeterminately with respect to the flywheel and which is automatically engaged by the pinion on the starter when the starter switch is closed; a plurality of arcuate slots circumferentially equally spaced through the ring gear; a retainer thrust ring; a corresponding number of shouldered cap screws projecting through suitable openings in the retainer ring and arcuate slots into threaded engagement with the flywheel proper; a plurality of normally preloaded springs circumferentially carried in equally spaced relation in arcuate recesses provided in the inner marginal edge portion of the ring gear and normally registering concavities in the confronting faces of the retainer ring and flywheel respectively, yieldably establish the normal relative disposition of the ring gear with respect to the flywheel in readiness to effect disengagement of the clutch; a plurality of camming ramps circumferentially equally spaced in the face of the ring gear in engagement with the flywheel; a corresponding number of actuating pins slidably supported in bearing apertures through the flywheel with one end of said pins tapered to engage the ramps when the ring gear is rotated relatively to the flywheel to actuate the pins; and a corresponding number of radially outwardly projecting extensions integral with the peripheral marginal portion of the clutch pressure plate acted on by the other end of said actuating pins to separate the pressure plate from the friction driven member of the clutch and thereby release the engine for rotation by its energized starter.

Another salient feature of the present invention is the automatic operation of the actuating pins out of interference with the normal power control of the clutch members when the clutch actuator is energized. This automatic operation is effected by the springs aforesaid at the instant the starter switch is opened to stop the starter motor thereby enabling it to disengage automatically from the ring gear and thus release the ring gear to automatically return to its normal relative disposition with respect to the flywheel and actuating pins so that each of said pins can retract into the space adjacent each of the camming ramps out of interference with the normal movement of the clutch pressure plate as is understood.

A further salient feature is the novel incorporation of arcuate depressions or recesses adjacent the surface termination of the pin actuating ramps on the ring gear, for reception of the tapered ends of the said actuating pins to yieldably hold the ring gear in its clutch disengaging relative position with respect to the flywheel to prevent fortuitous re-engagement of the clutch frictional members prior to the hydraulic clutch actuator becoming energized to take over normal control of said clutch members. This novel yieldable detent mechanism being effective under influence of the combined forces from the plurality of clutch engaging springs to prevent the ring gear from assuming its normal reset position with respect to the flywheel which would release the actuating pins thereby enabling the clutch members to re-engage, until the hydraulic clutch actuator becomes energized as by starting the engine, since at the instant of the engine starting, inertial differentials prevail with respect to the starter pinion engaged with the ring gear and the faster accelerating flywheel tending to overrun and return the ring gear to its normal deactivated position which, if such should occur prior to the hydraulic actuator taking over control of the disengaged condition of the clutch members, would instantly stall the engine thus requiring a restarting cycle of the engine. Stated differently, the detent mechanism insures full disengagement of the starter pinion from the ring gear only after the engine has started and prohibits resetting of the auxiliary disengaging mechanism until the hydraulic clutch actuator has taken over the control of the disengaged condition of the clutch members previously induced by the auxiliary disengaging mechanism.

Another object of the invention is to provide novel normally preloaded spring connecting means between the retainer ring and ring gear, said spring means including either a plurality of helically formed compression springs or leaf-type springs installed under pretension to normalize the relative disposition of the ring gear with respect to the flywheel upon power operation of the clutch becoming effective.

The present invention contemplates that the auxiliary disengaging mechanism operable in response to the engine cranking starter rotating the flywheel ring gear relatively thereto, may be employed on all types of power-operated friction clutches, whether such clutches are operated by hydraulic pressure created by an engine or vehicular driven pump, or a pump having an independent source of power operation or vacuum produced in the engine intake-manifold or by a vacuum pump driven from the engine or from a rotating element in the vehicle drive line. In installations utilizing the engine to produce the operating pressure for the hydraulic actuator, the auxiliary disengaging mechanism enables the engine to be started despite being under torque load from vehicle roll as a result of the gearbox being "in-gear" whereby the hydraulic actuator is energized to restore control of the clutch thereto, while in the case of engine failure or an independent source of operating pressure as in centralized hydraulic systems, the auxiliary disengaging mechanism enables disengagement of the clutch should the engine be under torque-loaded from vehicle roll to facilitate neutralizing the gearbox as by setting the shift-lever in "neutral" position thus enabling towing of the vehicle.

With these and other objects and advantages in view, the invention consists of the new and novel combinations, construction, and arrangement of parts as hereinafter more fully described, set forth in the claims appended hereto, and disclosed in the accompanying drawings forming part hereof, wherein:

Figure 4 is a fragmentary sectional view on an enlarged scale taken along the line 4—4 of Figure 1, and showing particulars of the pressure plate actuating elements and actuating ramps therefor carried by the ring gear in their respective normal positions;

Figure 5 is a fragmentary sectional view on an enlarged scale taken along the line 5—5 of Figure 1, and showing particulars of the springs for automatically returning the ring gear to normal position with respect to the flywheel wherein the auxiliary clutch disengaging mechanism is reset;

Figures 6, 7 and 8 are sectional views similar to Figures 3, 4 and 5, respectively, but showing the relative disposition of the parts in their operated positions wherein the clutch members are separated to release the engine for subsequent cranking by the starter;

Figure 12 is a fragmentary portion of Figure 1 showing, for example, a hydraulic actuator actuated to disengage the clutch in response to an associated hydraulic controlling system in which the accelerator pedal mechanism is in engine-idling position;

Figure 13 illustrates an operated position of the accelerator pedal to accelerate the engine and wherein clutch re-engagement is inaugurated; and Figure 14 illustrates a typical manually-controlled selective change-speed transmission having three forward speeds and a reverse speed, the transmission being shown in high speed (direct-drive) operating condition.

Figure 1:
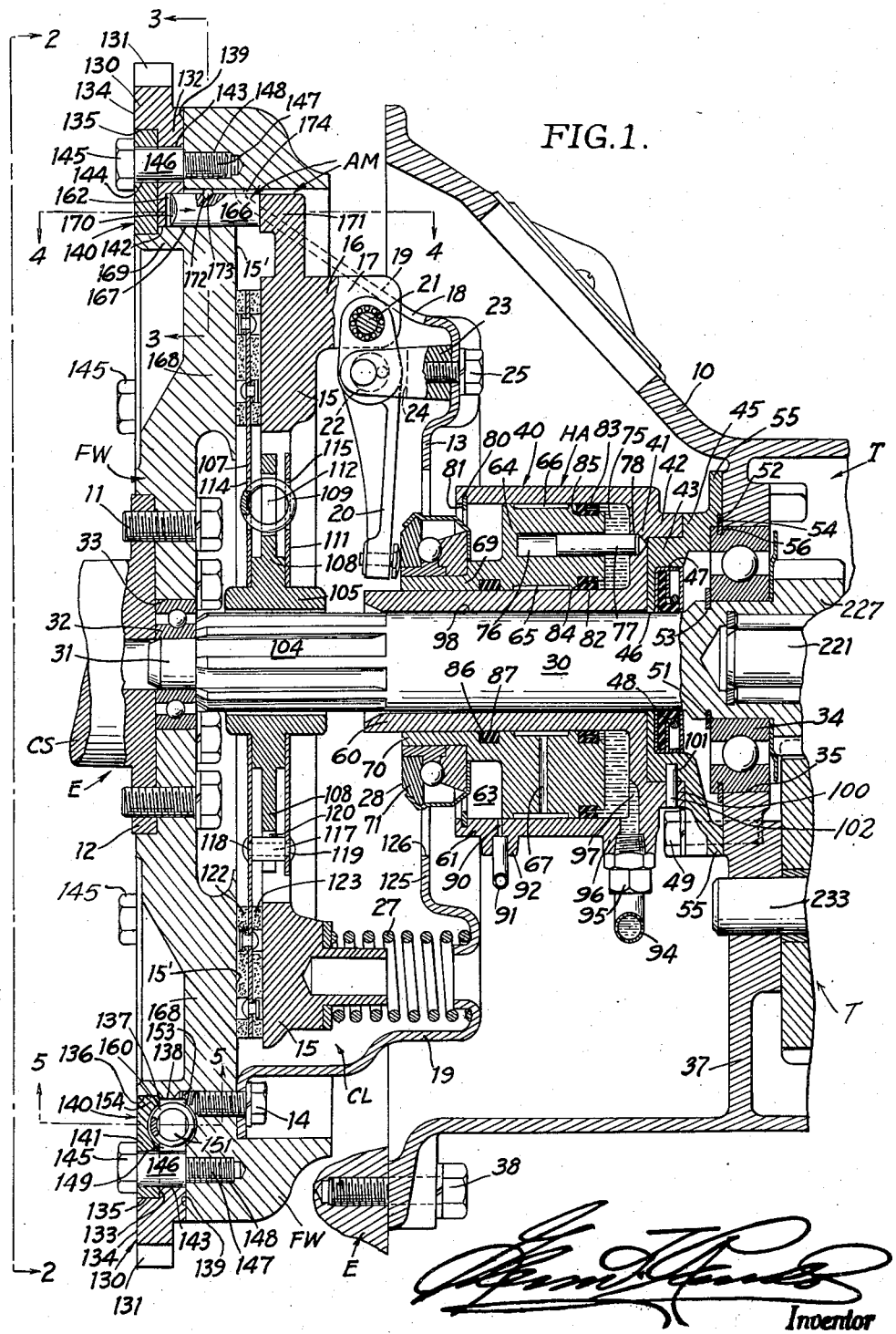
Figure 1 is a longitudinal vertical section of my new and improved power-controlled clutch mechanism constructed in accordance with the present invention, with the driving and driven members in normally engaged condition for transmission of drive torque.

Referring now to the drawings and particularly to Figure 1 thereof, there is disclosed a portion of an automotive internal-combustion engine "E," primarily the crankshaft "CS" and flywheel "FW" thereof, having associated therewith clutch controlling mechanism embodying my invention. The flywheel incorporates a spring-engageable friction clutch generally designated "CL" of substantially conventional construction for connecting the engine to a conventional manually shifted change-speed transmission "T," partially shown, through which the road wheels of the vehicle are driven at various gear ratios, as is well known in the art.

As best shown in Figures 1–8 inclusive, the engine driven clutch CL is operatively incorporated on the flywheel FW, and is enclosed by a housing 10 which also encloses the flywheel FW, the latter being secured as by bolts 11 to the rear flanged end 12 of the crankshaft CS for rotation therewith. The rear face of the flywheel carries a cup-shaped backing or cover plate 13 secured thereto as by cap screws 14, said plate having mounted thereon a movable clutch pressure plate 15 having an annular frictional surface adapted for relative axial movement toward and away from an annular confronting frictional surface 15' on the flywheel. The pressure plate 15 is provided with a plurality of integral peripherally disposed bosses 16 radially slotted at 17 and circumferentially equally spaced and disposed normal to the plane of the pressure plate. These bosses are adapted to project rearwardly through suitable slots 18 in the peripheral marginal wall portion 19 of the cover 13 whereby the pressure plate and cover rotate in unison and the aforesaid axial relative movement therebetween is accommodated. The pressure plate 15 is actuatable by the usual clutch releasing levers 20 (usually three in number equally spaced circumferentially) and which have their outer ends pivotally engaging the slots 17 in the bosses 16 at 21, and intermediate the aforesaid pivoted and inner free ends, the levers are pivotally connected at 22 to the backing plate as by supports 23 having their free ends slotted at 24 and the other ends anchored to the inner side of the backing plate as by cap screws 25 whereby pressure applied to the free inner ends of the levers withdraws the pressure plate from the flywheel friction surface 15' to disengage the clutch CL as is understood.

Between the backing plate 13 and the pressure plate 15 is a plurality of normally preloaded clutch engaging compression springs 27 (usually nine in number) and which serve to urge the pressure plate toward the flywheel in opposition to the reaction from the clutch releasing levers 20 acted on by a clutch throw-out bearing 28 actuated, for example, by a hydraulic clutch actuator or motor generally designated "HA" to separate the pressure plate from the flywheel and thereby disengage the clutch CL.

The hydraulic clutch actuator HA is concentrically disposed with respect to a clutch driven shaft 30 which is piloted at its forward reduced end 31 in a ball bearing 32 mounted in a circular aperture 33 centrally disposed in the flywheel as shown, and the other end of the shaft is supported on a ball bearing 34 mounted in a coaxially disposed circular opening 35 in the forward end wall 37 of the conventional change-speed transmission indicated generally by the reference character "T" applied to fragmentary portions of its housing and gear train, from which wall the housing 10 radiates forwardly in bell-shaped fashion for attachment to the engine block as is commercially practiced, by cap screws 38. The hydraulic actuator comprises: a cylindrical housing 40 provided with a rear wall 41 having an integral annular flange 42 projecting rearwardly therefrom, said flange being adapted to be press-fitted or otherwise secured on a complemental circular embossment 43 of a cup-shaped bearing and oil-seal retainer 45 having a central circular opening at 46 through which the shaft 30 extends and a circular recessed portion 47 for the reception of a conventional shaft sealing assembly 48, the retainer 45 being mounted on the forward side of the end wall 37 as by a plurality of cap screws 49. The ball bearing 34 is held in operating position within the circular opening 35 by a pair of inner and outer split retaining rings 51, 52 engaging annular channels 53, 54 respectively provided in the shaft 30 adjacent the forward side of the bearing and between the mating faces on the forward side of the end wall 37 and peripheral flanged portion 55 of the retainer 45 forming the rear open end of the latter, the outer ring engaging an annular groove 56 in the outer race of the bearing 34. The cylindrical housing 40 comprises inner and outer radially spaced circular walls 60, 61 respectively projecting forwardly from the end wall 41 to provide an annular cavity 63 therebetween. Reciprocably mounted in said cavity is a complementary ring-type piston 64 having inner and outer annular surface channels 65, 66 respectively in circular alignment and a radially disposed passageway 67 interconnecting said channels. Projecting forwardly from the inner circular portion of the piston 64 and integral therewith, is an extension 69 provided with a reduced diameter terminating portion 70 on which is mounted for relative rotation an inner and a rearwardly disposed portion of the conventional clutch throw-out bearing 28, with a forward rotatable race 71 thereof engaging the free adjustable ends of the clutch releasing levers 20 to thereby actuate said levers when the piston 64 is actuated forwardly by hydraulic pressure. An annular hydraulic pressure chamber 75 is provided between the rear end of the piston and end wall 41 of the actuator HA. A longitudinal hole 76 closed at its forward end and open at its opposite end is provided in the piston body for reception of a pin 77 having its opposite end pressfitted into a bore 78 provided in the end wall 41 whereby relative rotation of the piston 64 with respect to the cylinder 40 is prohibited. An internal annular groove 80 is provided in the inner surface of the outer cylindrical wall 61 adjacent its forward end. This groove receives a split-type retaining ring 81 for engagement by the forward outer circular portion of the piston 64 to prevent fortuitous displacement of said piston from the cylinder 40, said piston being fitted with inner and outer ring-type flexible seals 82, 83 carried in suitable circular grooves 84, 85 respectively, and forwardly spaced from the inner seal 82 is another annular groove 86 engaged by an O-ring pliant seal 87, the latter two seals being on opposite sides respectively of the inner channel 65 whereby hydraulic pressure in the chamber 75 is confined therein with any leak-by liquid being collected by the channels 65, 66 and conveyed from the inner channel to the outer channel via the radial passageway 67 to a port 90 spaced from the retaining ring 81 through the wall at the bottom side of the outer cylindrical wall 61 to a drain conduit 91 connected to an exterior boss 92 concentric with said port 90 to thus return such seepage from the pressure chamber 75 to the sump during clutch disengaging operations. A pressure line 94 is provided with a suitable commercial fitting 95 threaded into a boss 96 integral with the exterior of the outer cylindrical wall 61 for communicating with a passageway 97 leading to the pressure chamber 75. The inner cylindrical wall 60 is provided with a coextensive circular opening 98 through which the clutch shaft 30 freely extends forwardly.

In addition to the pressfit connection between the hydraulic cylinder HA and retainer housing 45, the flanged portion 42 and embossment 43 may be provided with aligned holes as at 100, 101 respectively through which a locking pin 102 is driven to insure a rigid connection between the hydraulic cylinder 40 and retainer 45.

The clutch shaft 30 is provided with a splined portion at 104 adjacent the forward piloted portion thereof, the splined portion receiving thereon a hub 105 for floating axial movement with respect thereto. This hub carries thereon a clutch disc 107 secured thereto by means of a flange 108 on the hub 105 and a plurality of coil-type cushioning springs 109 (usually six in number) which extend through the hub flange and clutch disc in radially offset relation to the axis of the shaft 30. The disc 107 is disposed on one side of the flange 108 and a balance ring 111 is disposed on the other side thereof. The cushioning springs which are normally preloaded, more particularly are carried by the flange 108 in radially disposed slots 112 provided in the peripheral marginal portion thereof and normally registering openings 114, 115 provided in the disc 107 and balance ring 111 respectively. The clutch disc 107 and the balance ring 111 are further secured together by means of rivets 117 extending through aligned holes 118, 119 and through oversize slots 120 in the flange, the purpose of which will be fully explained later.

Opposing outer peripheral marginal faces on the clutch disc 107 are provided with annular friction facings 122, 123, respectively. These facings serving to clamp the disc 107 to the flywheel frictional surface 15' by action of the pressure plate 15 under influence of the clutch-engaging springs 27 whereby the disc 107 serves to couple the crankshaft CS to the clutch driven shaft 30 for transmission of drive torque from the engine to the associated change-speed transmission T.

The clutch cover 13 comprises a rear wall portion 125 provided with a central circular opening 126 for freely accommodating movement of the throw-out bearing 28 by the hydraulic piston 64 to actuate the clutch releasing levers 20 and thereby move the pressure plate 15 rearwardly to the position corresponding to the actuated position of the hydraulic piston in Figure 12, such actuation of the levers being against the action of the clutch-engaging springs 27 as is understood.

Figure 2:
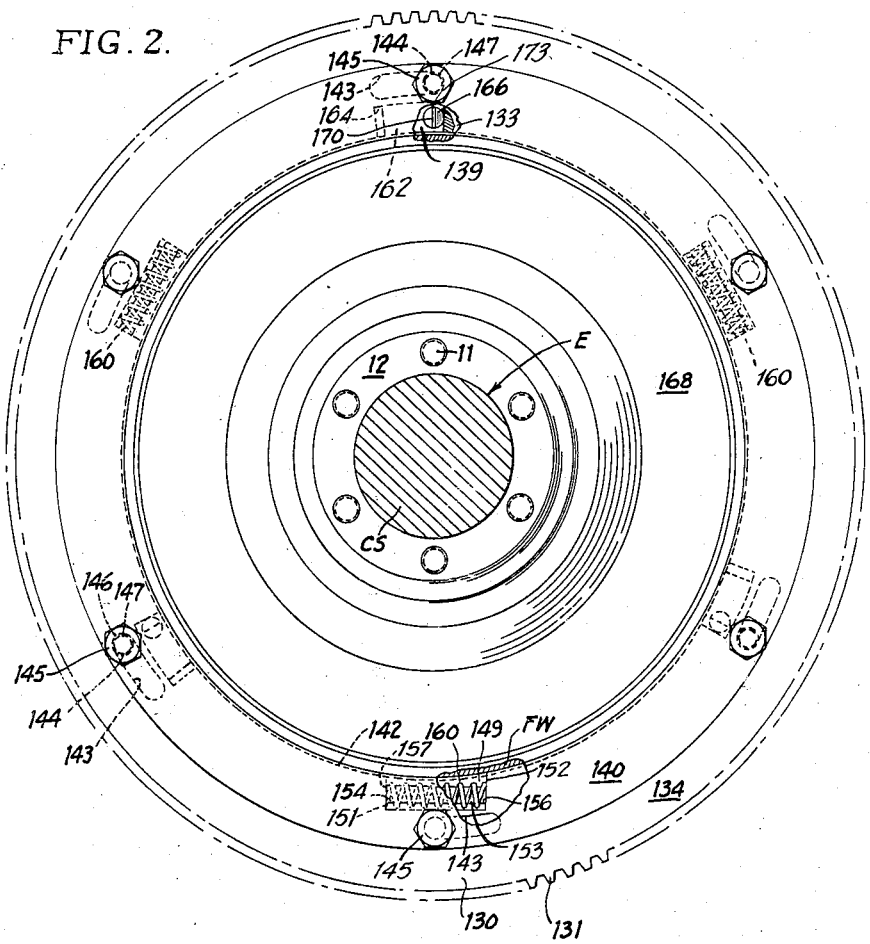
Figure 2 is a front end view of Figure 1 taken from the line 2—2 looking in the direction of the arrows, showing the parts in normal disposition wherein the ring gear actuated auxiliary clutch disengaging mechanism is deactivated and the engine starter pinion disengaged.

The new and novel auxiliary clutch disengaging mechanism is generally designated "AM" which is operatively incorporated on the engine flywheel FW comprises: a ring gear 130 having an outer toothed portion 131 and an inner offset portion 132, the periphery of the latter portion being flush with the periphery of the flywheel. The forward face 133 of the offset portion forms with the forward portion face 134 of the toothed portion an internal circular face portion 135, and oppositely disposed with respect thereto is an annular surface 136 provided on the flywheel proper, said surface 136 providing an annular shoulder at 137 with a larger annular surface 138 also integral with the flywheel, the latter surface merging at right angles to a lateral surface 139 on the flywheel terminating at the periphery thereof. A retainer and thrust ring 140 is disposed between said surfaces 135, 136 to receive lateral thrust on its rear surface portion 141 from the ring gear and to maintain the ring gear in properly assembled operating relation on the flywheel, the inner marginal surface 142 of the ring gear being supported on the larger annular surface 138. As best shown in Figure 2, the forward sides of the toothed portion of the ring gear, the retainer ring and the flywheel are substantially flush. A plurality of arcuate slots 143 (preferably six in number) are provided through the wall of the offset portion 132, and a corresponding number of circular holes 144 are provided through the retainer ring in alignment with the righthand ends of the slots 143 as viewed in Figure 2. Cap screws 145 having a smooth body portion 146 and a reduced diameter threaded portion 147 project through the holes 144 and slots 143 into threaded engagement with threaded holes 148 in the flywheel proper to assemble the retainer ring and ring gear on the flywheel as best demonstrated in Figure 1, whereby the arcuate slots 143 accommodate limited relative rotation of the ring gear with respect to the flywheel as defined by the length of the slots 143 with respect to the smooth body portion 146 of the cap screws. The length of the smooth body portion being slightly longer than the combined widths of the retainer ring and offset portion of the ring gear to enable the ring gear to have relative rotational movement without binding with respect to the flywheel FW. A plurality of substantially rectangular openings 149 having their sides adjacent the periphery open are indented in the marginal surface 142 on the offset portion of the ring gear, and preferably three (3) openings are employed and disposed inwardly radially with respect to the cap screws 145 to provide a balanced assembly on the flywheel. These openings, each having one side open, are U shape in configuration thus providing legs or shoulders 151, 152 respectively at their ends. Normally registering with the openings 149 are elongated arcuate concavities 153, 154 provided in the confronting faces 139, 141 on the flywheel and retainer ring respectively. The ends of these concavities provide shoulders 155, 156 on the flywheel and 157, 158 on the retainer ring respectively. Accordingly, as best shown in Figure 5, the shoulders 151, 155, 157 and 152, 156, 158 are in alignment when the ring gear 130 is in its normal reset position as shown in this figure wherein the right ends (see Figure 2) of the slots 143 are engaged with the smooth body portions of the cap screws 145. Confined between the shoulders aforesaid of each opening 149 is a normally preloaded compression spring 160 of substantially the same diameter as the width of the rectangular openings and depth of the associated arcuate cavities on either side. These springs serve to automatically return the ring gear to its normal relative (reset) disposition with respect to the flywheel FW as shown in Figures 1 and 2, and therefore, the ring gear of the present invention may be termed "spring-loaded."

Figure 3:
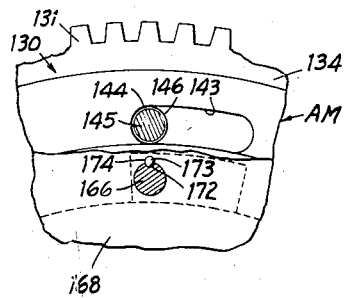
Figure 3 is a fragmentary sectional view on an enlarged scale taken along the line 3—3 of Figure 1, showing the parts in normal disposition wherein the clutch pressure plate actuating elements are disposed opposite the lowermost portion of their respective camming ramps carried by the ring gear.

Diametrically disposed from the springs 160 aforesaid are a corresponding number of angular camming ramps or surfaces 162 provided in the opposite lateral surface portion 163 on the offset portion of the ring gear, said latter surface portion intimately engaging the surface portion 139 on the flywheel, the left end of the ramps 162 terminating flush with the surface 163 and immediately adjacent thereto is a depression 164 best shown in Figure 4 which performs an important function to be fully described hereinafter. As will be observed on inspecting Figures 2 and 3, the lowermost or bottom portions of the ramps 162 are each normally disposed in alignment with actuatable plungers or pins 166 slidably disposed in bores 167 through the vertical wall portion 168 of the flywheel FW subjacent to a flanged portion 169 thereof. The forward ends of these pins are tapered at 170 and normally spaced from the lowermost portion of the camming ramps, while the other ends of said pins are adapted to engage the upper ends of three radially projecting lugs 171 integral with the periphery of the pressure plate 15, said lugs are in radial alignment with the slotted bosses 16 and project therewith through the openings 18 provided in the wall portion 19 of the clutch cover 13 best shown in Figure 1. Each pin 166 is provided with a surface recess 172 for reception of a portion of a spherical element such as a steel ball 173 with the exposed portion of the ball engaging a longitudinal surface channel 174 provided in the wall of the bore 167, said ball and channel cooperating to prevent relative rotation of the pins with respect to their respective bores thus maintaining the tapered ends of the pins in proper operating position with respect to the camming ramps engaged thereby. Accordingly, it is seen that clockwise relative rotation of the ring gear 130 as viewed in Figure 2 brings the working surfaces of the camming ramps 162 into engagement with the tapered ends of the actuating pins 166 to force the pins rightward in the direction of the arrow as viewed in Figure 1 thus moving the pressure plate 15 in the same direction to separate the friction discs 122, 123 from the flywheel frictional surface 15' and pressure plate 15 respectively, which, in effect, disengages the clutch as is well understood. Completion of the relative c'ockwise rotation of the ring gear 130 brings the depressions 164 opposite the tapered ends of the pins 166 and since the pressure plate 15 is at all times under spring load from the clutch-engaging springs 27, the pins 166 are projected to the left as shown in Figures 1 and 3 into said depressions to yieldably hold the ring gear in its clutch disengaging position until the hydraulic actuator HA takes over control of the clutch in response to operation of the engine to produce operating pressure therefor. As soon as the engine is operating which energizes the hydraulic actuator HA, the piston 64 thereof moves leftward to the position of Figure 12 wherein the release levers 20 acting on the pressure plate 15 withdraw the latter a greater distance rightward than the actuating pins 166 and camming ramps are capable of, and, as a consequence, the actuating pins are released thus enabling the springs 160 to disengage the tapered ends of the pins from their cooperating depressions 164 and return the ring gear 130 to its normal position with respect to the flywheel wherein the relative operating movement therebetween is re-established in readiness for another clutch disengaging cycle by the ring gear in the event the hydraulic actuator HA is disabled or incapable of being energized due to starting of the engine being prohibited as a result of the transmission T being left "in-gear" and the clutch CL closed enabling coasting load from the vehicle to be imposed on the active interengaged elements of the transmission T thereby locking the shift-lever from movement to "Neutral" position to free the engine for starting by its starting motor in usual manner. Accordingly, the auxiliary clutch disengaging mechanism AM forming the present invention enables starting of the engine irrespective of whether the engine is torque-loaded as in the case of the car being parked "in-gear" with its brakes off or stalling while the vehicle is being started or driven, by disengaging the clutch CL in response to relative rotation of the ring gear 130. Even though the engine is released with the transmission T neutralized, the compression effect of the engine is sufficient to enable the auxiliary disengaging mechanism to be operated to open the clutch CL prior to the power-controlling system taking over normal control of the disengaging and re-engaging of the clutch.

It should be noted here that upon normal power-control of the clutch CL becoming effective, the spring 160 automatically return or reset the ring gear 130 and release the actuating pins 166 to their respective normal positions as shown in Figure 1 wherein the auxiliary clutch disengaging mechanism AM is retracted out of interfering with the normal power-control operations of the clutch CL as will be more fully explained in the "Operational" description to follow.

Figure 6:
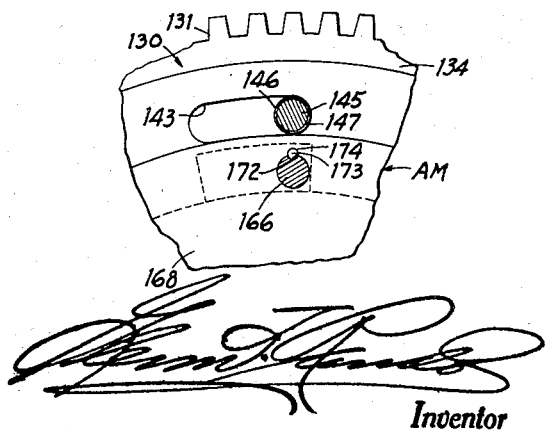

The cooperating depressions 164 and tapered ends 170 of the pins 166 provide a yieldable detent device for releasably locking the ring gear 130 in its operated position shown in Figures 6, 7 and 8 prior to normal power-control of the clutch CL becoming effective. The locking force imparted by this detent device is of such magnitude as to maintain the ring gear in its operated position after withdrawing the pressure plate 15 despite inertial differentials obtaining between the rate of increasing acceleration of the flywheel FW and ring gear 130 induced at the instant of starting the engine, and the normal rotational velocity of the starter pinion engaged with the ring gear at the instant the engine takes hold or fires. Were this detent device not incorporated in the apparatus AM, the instant the engine starts, resulting in sudden acceleration of the flywheel, the ring gear 130 would tend to lag behind the rate of flywheel rotation and thereby return the ring gear 130 to its normal deactivated position shown in Figure 1 wherein the clutch pressure plate 15 would close under influence of the engaging springs 27 and thus stall the engine where the shift-lever is left "in-gear." Accordingly, the detent device serves the important function of maintaining the ring gear 130 in operated clutch disengaging position until the engine starts and until the pinion on the starting motor demeshes from the ring gear. This demeshing operation may occur at substantially the same time as the normal power-control is taking over the withdrawn position of the pressure plate 15 to further withdraw it. Thus, the detent device insures that the ring gear remains in operating position during the interval obtaining between the first power impulse from the engine and the instant the normal power-control of the clutch CL becomes effective, to prevent the clutch from reengaging until the driver is ready to start the car as by depressing the accelerator pedal.

Figure 9:
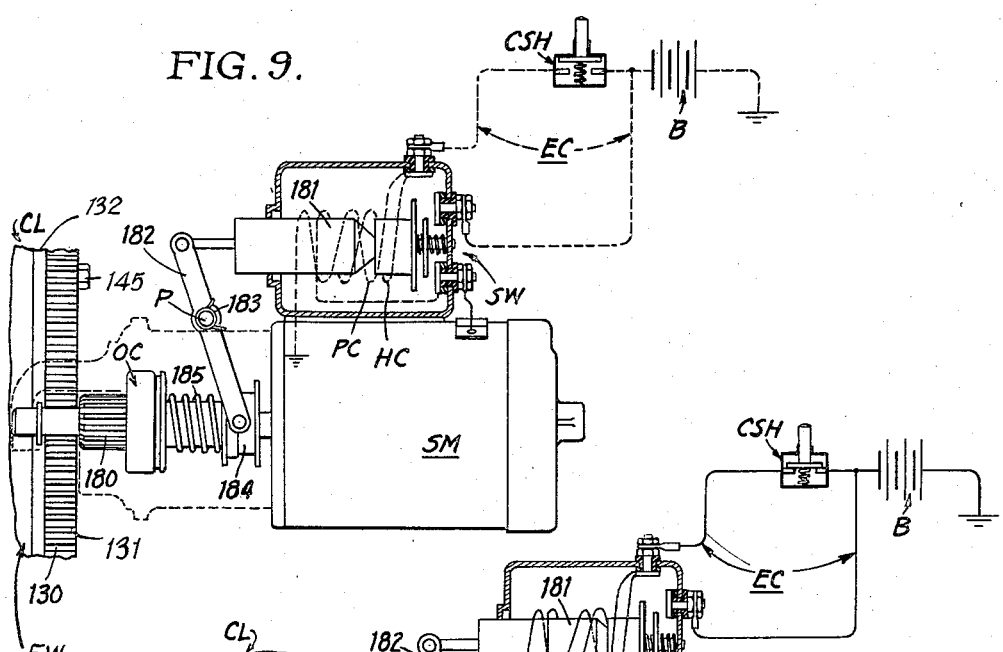
Figure 9 is a schematic view of a conventional starting motor installation and associated electrical control circuit therefor, said motor being disengaged from the engine flywheel ring gear.
Figure 10:
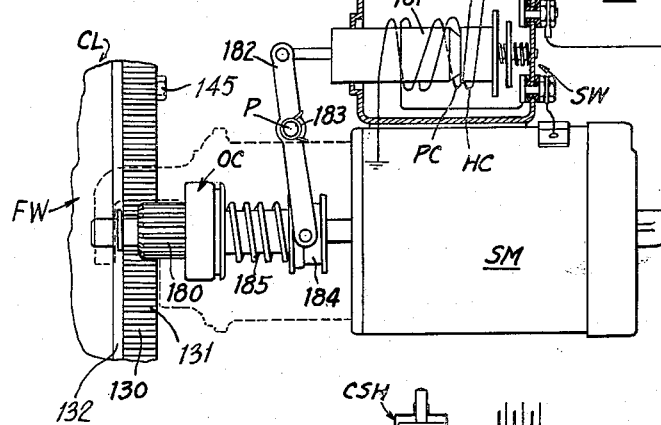
Figure 10 is a schematic view similar to Figure 9 but showing the motor energized and in the process of engaging its pinion with the flywheel ring gear.
Figure 11:
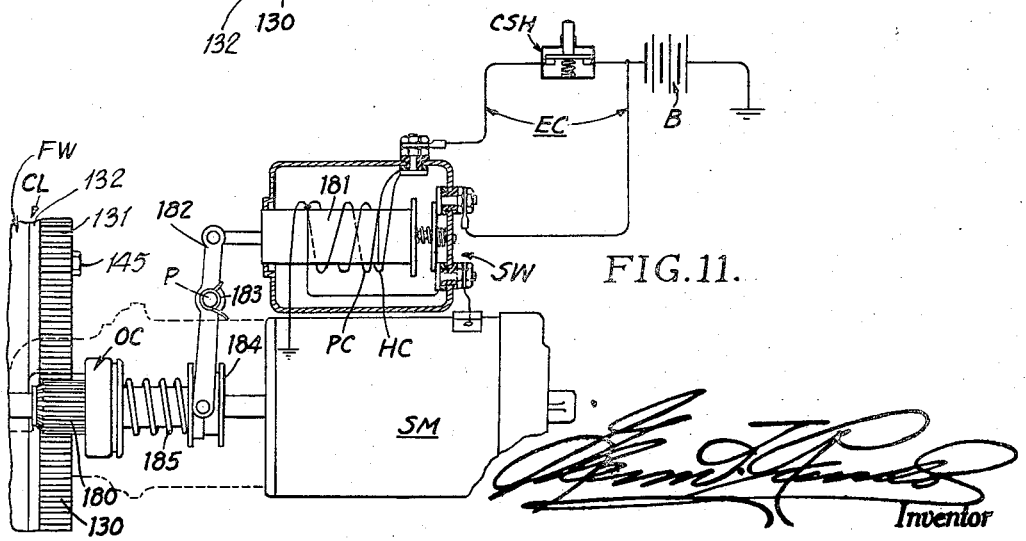
Figure 11 is a schematic view similar to Figure 10, but showing the starter pinion fully engaged with the ring gear and cranking the engine following disengagement of the clutch members by the auxiliary disengaging mechanism.

Figures 9, 10 and 11 illustrate schematically a typical electric starting system for internal-combustion engines employed to power automotive vehicles and the like, and therefore, the components comprising such a conventional system will only be described generally with respect to their construction and operation as follows:

Referring to Figure 9, the starting motor "SM" is the overrunning clutch drive type and is shown with its drive pinion 180 disengaged from the ring gear 130 and incorporated in an electrical control circuit "EC" comprising a battery "B," control switch "CSH," starting switch "SW," holding coil "HC," pull-in coil "PC," said circuit being shown in broken lines to indicate its de-energized condition. The starting motor SM is usually flange mounted to the flywheel housing. The solenoid plunger 181 is connected to one end of a shift-lever 182 pivoted at "P" and biased in a disengaging direction of movement by a torsional spring 183 encircling said pivot, and the other end of the lever engages a shift-collar 184 which is operatively connected to an overrunning clutch "OC" operatively associated with the starter pinion 180. A recoil spring 185 is operatively disposed between the shift-collar and over-running clutch to mesh the pinion with the ring gear teeth which, if abutment occurs therebetween, the spring enables the ends of the pinion teeth to ratchet over the confronting ends of the ring gear teeth thereby preventing damage thereto as well as possible damage that could result from solenoid-energized engagement of the starter pinion.

Closure of the control switch CSH energizes the control circuit EC causing the solenoid plunger 181 to actuate the shift-lever and thus mesh the pinion 180 with the ring gear teeth 131 immediately followed by closure of the solenoid controlled starting switch SW to energize the starting motor and thus crank the engine. Upon the engine starting, the control switch CSH is released to open position causing the control circuit EC to become de-energized and the pinion 180 to demesh from the ring gear teeth by action of the return spring 183 associated with the shift-lever, or in some installations the starting switch return spring or screw-type pinion shaft performs this function of demeshing.

Figure 10 shows the starter pinion 180 in the process of engaging the ring gear 130, and Figure 11 shows the starting motor cranking the engine with the ring gear in operating position as shown in Figures 6, 7 and 8 thereby effecting disengagement of the clutch CL. Thus, the starting motor SM serves the dual purpose of disengaging the clutch CL, and then starting the engine in usual manner. The overrunning clutch OC protects the starting motor SM from excessive speeds after the engine fires, until the pinion demeshes from the flywheel ring gear.

Accordingly, the present invention provides new and novel auxiliary clutch disengaging mechanism responsive to energization of the starting motor and effective prior to cranking the engine whereby the engine may be restarted irrespective of the compressive effects within the engine and/or torque-load thereon, such mechanism being particularly advantageous in vehicles equipped with power-operated friction clutches for transmitting drive torque from the engine to a manually-operated gearbox such as exemplarily illustrated in Figures 12, 13 and 14.

Figure 12 illustrates a hydraulic control circuit of substantially conventional character and which incorporates a gear-type hydraulic pump "HP" which is typical of such pumps driven from the engine for lubricating the moving parts thereof under pressure, or similar pump installations mounted on the exterior of the engine or driven independently by an electric motor for operating commercial hydraulically-actuated steering systems, or driven from the tailshaft of commercial hydraulically-actuated automatic transmissions. The conventional pump design illustrated comprises: a pair of intermeshed drive and driven gears 190, 191 respectively rotatable within a housing 192 having the major portion of the interior of its wall in close adjacency to the periphery of the gear teeth, a suction pipe 193 in continuous communication with an oil sump 194 and the pump intake port 195, a pressure discharge port 196 connected to a hydraulic line 197, and another pipe 198 leading from the hydraulic line 197 to the oil sump via a spring-loaded pressure regulating valve "RV" and pipe 199 connected to the suction line 193. The hydraulic circuit also includes a rotary-type hydraulic valve "AV" comprising a housing 200, an element 201 rotatable in the housing, a diametrically disposed cross passageway 202 through the element normally interconnecting diametrically opposed ports 203, 204 provided through the housing wall, and a variable depth depression 205 in the cylindrical surface of the element in continuous communication with a third port 206 provided through the valve housing. The hydraulic line 197 is connected to the pressure line 94 which feeds liquid under pressure to the hydraulic piston 64 to actuate the same to the position shown wherein the clutch CL is disengaged. The pressure line 197 being connected to port 203, and the other port 204 being also connected to this line enabling liquid under pressure from the pump to be conveyed through the passageway 202, port 204, line 197, line 94 to the hydraulic actuator HA. The third port 206 is connected via a hydraulic return line 207 to the line 91 and thence to the sump 194 whereby rotation of the element 201 to the position of Figure 13 cuts off the pressure produced by the pump in the line 197 to the hydraulic actuator HA, and connects port 204 and line 197 to the variable depression 205 to effect a controlled release of the hydraulic pressure in the hydraulic actuator cylinder 40 and lines 94, 197 back to the oil sump thereby enabling the clutch-engaging springs 27 to slowly close the pressure plate 15 on the friction discs 122, 123 to re-engage the clutch CL as shown in Figure 1.

The rotatable valve element 201 has a shaft 209 projecting coaxially thereof from one side through a suitable bearing to the exterior of the housing, and on which is secured an L-shaped lever "L" having two arms 210, 211, arm 210 being connected by a link 212 to a conventional accelerator pedal "AP," and the other arm 211 being connected by link 214 to the usual engine throttle plate operating mechanism (not shown) whereby movement of the accelerator pedal is effective to open and close the engine throttle and rotate the valve element 201 simultaneously to control operation of the hydraulic actuator HA. Release of the accelerator pedal under influence of a return spring shown at 215 to engine idling position depicted in Figure 12, opens the hydraulic valve "AV" to cause the hydraulic actuator HA to disengage the clutch CL, and depressing of the accelerator in an engine accelerating direction as viewed in Figure 13 cuts off hydraulic pressure from the pump to the hydraulic actuator and releases the liquid under pressure from the hydraulic chamber 75 under influence of the clutch-engaging springs 27 to enable re-engagement of the clutch CL as portrayed in Figure 1.

Figure 14 illustrates the conventional manually-shifted synchro-mesh transmission or gearbox T shown fragmentarily in Figure 1 as having three forward speeds and a reverse speed. This transmission T being of conventional construction and operation will be described only briefly in connection with the hand-shifting mechanism as follows:

A first and reverse speed sliding gear 220 is illustrated in neutral position and is adapted to be moved by shifting fork 221 to the rear into meshed relation with a reverse idler gear 222 which in turn is constantly meshed with a countershaft gear 223, and to be moved forwardly to mesh with a countershaft first-speed gear 224 to establish first-speed drive. Second and high speed (direct drive) are selectively established by means of a slidable blocker synchronizer assembly 225, indicated as slidably mounted in the conventional manner on the transmission main shaft 226 between the main driving gear 227 and a second speed main shaft gear 228. The blocker assembly is movable by shifting fork 230 on the main transmission shaft from a "Neutral" position in either direction, rearward movement serving to couple the second-speed gear 228, while forward movement to the position shown couples the main transmission shaft directly to the driving shaft 30 to establish direct-drive through the transmission as is well understood. The second-speed gear 228 on the main transmission shaft is in constant mesh with a second-speed countershaft gear 231, and the main drive gear 227 is constantly meshed with a counter-shaft drive gear 232. The countershaft gears provide what may be termed a "gear cluster" which is rotatably mounted on a countershaft 233 supported at each end on the end walls of the transmission housing. Shifting forks 221, 230 are mounted on shafts 234, 235 respectively which are journaled through the housing cover 236 to the exterior, and arms 238, 239 are secured to said shafts respectively to impart corresponding movements to the connected shifting forks and slidable elements 220, 225 whereby selective establishment of the three forward speeds and the reverse drive is effected in a well known manner. The usual interlocking mechanism "I" is provided between the shifting forks to prevent simultaneous movement of said forks.

The hand-shifting mechanism comprises the usual hand-lever 240 attached to and projecting radially from a shaft 241 carried by and extending parallel to the steering column 242, the shaft and lever assembly being rockable about the axis of the shaft and also movable longitudinally of the steering column during shifting to accommodate movement of the lever in a conventional H-shifting pattern such as denoted by appropriate letters upon the indicator plate 243 mounted on the steering column beneath the steering wheel. At its lower extremity, the shaft 241 is rotatably mounted in a bracket "BR" and is provided with a diametrically projecting cross pin 244, these parts also being conventional in their operation and disposition. It will be recognized that when the lever, and accordingly the shaft 241, are raised so that the pointer 245 travels in the upper leg of the H-gate, the cross pin 244 lies within the diametric slot 247 in the hub 248 of the arm 249. When the lever 240 is rocked between reverse and low-speed positions, designated "R" and "L" respectively upon the plate 243, the arm 249 is correspondingly rocked, the motion being transmitted through link 250 and arm 238 to the fork 221 and thereby to the shiftable gear 220 in the usual manner. When the shift-lever 240 and shaft 241 are lowered so that the pointer 245 travels in the lower leg of the H-gate, the cross pin 244 lies in the slot 251 provided in the upper extremity of the hub 252 of arm 253 and, as shown, has been rotated to establish direct-drive. The slots 247, 251 are so positioned in "Neutral" as to be aligned with one another and to produce in effect an uninterrupted passage for the cross pin 244 when both arms 249, 253 are in "Neutral" position. The arm 253 is connected by link 254 to arm 239 whereby corresponding shifting movements are imparted to the blocker synchronizer 225 to selectively establish second and direct-drive according to the setting of the hand-lever pointer 245 at "S" and "H" respectively on the H-gate.

Operational summary

Although the manner in which my invention achieves its objectives should be manifest from the foregoing description augmented by an inspection of the drawing, a brief restatement is deemed apropos, and will be given as follows:

The clutch CL will be considered engaged as shown in Figure 1, the engine stopped and the transmission T in high speed direct-drive condition as shown in Figure 14. Assuming the vehicle is parked on a gradient with its brakes "off" thus enabling the "roll" of the vehicle to impose coasting load drive on the drive line due to certain of the transmission elements, and the driving and driven member of the clutch CL being engaged, the free rotation of which is opposed by the compressive effects within the engine combustion chambers tending to lock, for example, the high speed drive against being neutralized by movement of the shift-lever 240 from H to "N" position (see Figure 14). Under such circumstances the driver is unable to free the engine for restarting as by manually closing the control switch CSH as under such conditions the starting motor SM would be required to move the car forwardly in high gear in addition to turning over the engine against its compression, the power of the starting motor being insufficient to move such a load. However, the driver of a motor vehicle equipped with the present invention may readily release and start the engine without operating additional controls other than those presently standard on motor vehicles by merely closing the control switch CSH to energize the electrical circuit EC causing the starting motor to be energized and mesh its drive pinion 180 with the ring gear 130 thus rotating the latter relatively to the flywheel FW to actuate the pins 166 into thrust engagement with the pressure plate 15 thereby opening the clutch members and releasing the engine so that the starting motor can crank it. The instant the engine fires, hydraulic pressure is inaugurated by the pump HP which in turn is directed by the rotary valve AV to the hydraulic actuator chamber 75 causing the piston 64 thereof to move forwardly from the position shown in Figure 1 to the position of Figure 12 wherein the clutch pressure plate 15 is additionally withdrawn from the friction disc 107 to restore normal control of the clutch CL to said hydraulic actuator, and, as a consequence of such energization of the hydraulic actuator HA thrust impressed on the pins 166 by the relatively rotated ring gear 130 is relieved thereby freeing the ring gear to return automatically under influence of the springs 160 to reset position shown in Figure 1. It being recalled that the ring gear disengagement of the clutch CL is only sufficient to release the engine, even slight frictional drag may be present between the driving and driven members but insufficient to transmit driving torque to the transmission T, and thereafter when the hydraulic actuator becomes operative in response to the engine driving the hydraulic pump HP, the piston 64 moves forwardly to the position shown in Figure 12 in abutting relation with the stop ring 81 to actuate the release levers 20 through their full operating stroke which withdraws the pressure plate 15 beyond the position effected by the ring gear actuation thereof. Accordingly, when the hydraulic actuator takes over the control of the pressure plate 15 in the manner above described, the pins 166 are freed of the locking action between depressions 164 and tapered ends 170 of the actuating pins 166 to thus enable the pins to move rightward out of the depressions induced by the action of the tapered ends camming out of the depressions in response to the resetting spring action on the ring gear.

From the foregoing, it is clear that any resistance to rotation of the flywheel FW is overcome by the initial releasing operation of the engine by relative rotation of the ring gear 130 actuated by the starting motor SM followed by starting of the engine, so that the advantages provided by eliminating a clutch pedal are fully realized without any possibility of the vehicle being rendered inoperative by a locked "in-gear" condition. It is important to further note that should the engine fail to start, my novel auxiliary disengaging mechanism AM operable in response to the starting motor is capable of disengaging the clutch CL and maintaining it disengaged for towing the vehicle should the transmission become locked "in-gear" for any reason.

Another important feature of the present invention is found in the spacing of the taper ends 170 of the actuating pins 166 from the lowermost portion of the camming ramps 162 to compensate for wear on the friction discs 122, 123. As the friction facings wear thinner, the pressure plate 15 moves the actuating pins closer to the working surface of the camming ramps 162 with respect to their installed disposition as depicted in Figure 1, and consequently, wear on the friction faces advances the point on the working surface of the ramps at which clutch disengagement is inaugurated by the ring gear 130 causing the clutch to disengage at a less initial rotational movement of the ring gear until the facings wear down to the heads of the rivets which secure the facings to the peripheral marginal portion of the disc 107. At this point of wear the facings should be replaced. Accordingly, the space obtaining normally between the tapered ends 170 of the actuating pins 166 and their cooperating working ramps 162 when the facings are new, compensates for subsequent wear to prevent the pins 166 from holding the pressure plate 15 in disengaged position. Stated differently, were the tapered ends 170 of the pins originally installed in engagement with the beginning of the working ramps 162, slight wear on the facings 122, 123 would enable the pressure plate 15 under influence of the clutch-engaging springs 27 to stand off from the worn facings thereby rendering the clutch CL ineffective to transmit driving torque as is understood.

The present invention contemplates use with any type of spring-engageable or pressure-engageable clutch, whether the release levers 20 are actuated by hydraulic, super-atmospheric or sub-atmospheric pressure (negative), or through the medium of the usual foot-operated pedal to withdraw the pressure plate 15, since my auxiliary disengaging means AM are independent of the actuating means for the normal operation of the clutch CL. It is further stressed that the present invention is readily associated with foot-operated clutches through the medium of the usual clutch pedal of the pendant-type or the type which projects through the toe board of the driver's compartment. Such operator-operated clutches derive special advantages from the present invention in the control of the vehicle when starting on a grade. In such cases, the driver would apply his right foot to the accelerator pedal and his left foot to the service brake pedal and hold the brakes "on" while starting the engine even though the transmisison may be "in-gear" and coasting load torque on the engine. Closing the manually-operated starting switch CSH results in the starting motor becoming energized which instantly disengages the clutch, freeing the engine for starting and as soon as it fires, the brakes can be held "on" to insure that the engine is warmed up sufficiently to prevent stalling when attempting to start the car. To start the car the driver merely releases the brake pedal and applies his foot to the clutch pedal to take over control of the clutch engaging and disengaging action. The clutch is now smoothly fed in as the engine is accelerated by depressing the accelerator to start the vehicle, and should the grade be steep requiring additional braking of the vehicle from the service brake then the driver would transfer his left foot to the brake pedal to properly control the vehicle under conditions of the grade involved. It is therefore, seen that the present auxiliary disengaging mechanism has a wide range of practical applications in motor vehicles whether the clutch be driver or power-operated.

Considering the terminology used in the foregoing description and in the appended claims, the identifying expressions and/or terms employed are intended to convey meanings which include the range of reasonable equivalents in the patent sense. For example, "hydraulic actuator," "motor," "power cylinder," "power means," "power-mechanism," "power control," are intended to include the illustrated hydraulic actuator or motor HA for disengaging the clutch CL or any other type of actuator serving the same purpose. The terms "front," "forward," "rear," "bottom," "rightward," and other directional words or characters except those referring to the direction of motion of the vehicle, are intended to have only relative connotation for convenience in describing the structure as illustrated, and are not intended to be interpreted as requiring any particular orientation with respect to associated structure external to the present disclosure.

Although it will be apparent that the preferred embodiment of my invention herein disclosed is well calculated to fulfill the objects above stated, it will be appreciated that I do not wish such to be limited to the exact construction and/or arrangement of parts shown, since it is evident that modifications, variations, changes, and substitutions may be made therein without departing from the proper scope or fair meaning of the subjoined claims.

Having thus described my invention, I claim:

1. In engine-driven friction clutch mechanism having driving and driven members for transmitting drive-torque from the engine when engaged, an electric engine starter, power-operated means for normally controlling disengagement and re-engagement of said clutch members, and a source of power derived from operation of the engine for operating said power-operated means: auxiliary clutch controlling means including mechanism actuated by the engine starter prior to starting of the engine and including means interconnecting said starter and said engine for disengaging the clutch members independently of the power-operated means; and an electrical control circuit including a source of electrical energy, a personally-operated switch and means energized by said source upon operation of said switch for energizing said starter.

2. In power-controlled friction clutches having interengaging fricton members for transmitting drive-torque from an engine having a flywheel and starter, to an associated change-speed gearing which subjects the engine to torque-load when a speed is active and the clutch engaged: separate clutch disengaging means including cooperating elements carried by the flywheel and by an element of said gearing, respectively, for activation by the engine starter prior to cranking the engine for disengaging the clutch to release the engine for starting; and means controlled by operation of the engine for activating normal power-control of said clutch whereby the separate disengaging means are automatically deactivated to not interfere with the said normal power-control thereof; and an electrical control circuit including a source of electrical energy, a personally-operated switch and means energized by said source upon operation of said switch for causing the starter to be energized.

3. In clutch controlling mechanism comprising: an engine flywheel incorporated clutch having frictionally engageable members for transmitting engine-torque to a change-speed gearing including torque-transmitting elements shiftable to and from interengaged relation, which elements resist disengagement while under torque-load, and power-operated means for normally disengaging said clutch members and accommodating their re-engagement: a ring gear carried by the flywheel and relatively movable predeterminately with respect thereto, a plurality of elements carried by the flywheel and during relative movement thereof to disengage the said clutch members independently of said power-operated means; normally preloaded spring means operatively disposed between the flywheel and ring gear for biasing the ring gear to normal relative disposition with respect to the flywheel; an electric engine starter having a drive pinion operable to engage the ring gear to successively actuate the ring gear relatively with respect to the flywheel to actuate the plurality of actuating elements to disengage the clutch members and to start the engine; and an electrical control circuit including a source of electrical energy and an operator-operated switch for controlling operative energization of said electric starter.

4. In a vehicular drive system including a torque-producing internal combustion engine having a starting motor, a flywheel and accelerator mechanism actuatable from a predetermined position through a range of movement to control operation of the engine, a change-speed transmission receiving torque-load from the engine, relatively movable torque-transmitting clutch members disposed between said engine and transmission for engagement with one another to transfer said torque-load therebetween, and power means operable to control normal disengagement and re-engagement of said clutch members under influence of the accelerator mechanism: a ring gear carried by the flywheel and relatively movable predeterminately with respect thereto; a plurality of circumferentially equally spaced elements carried by the flywheel and actuatable by said ring gear during relative movement thereof to disengage the said clutch members independently of said power means; a plurality of circumferentially equally spaced angular camming surfaces provided on the ring gear and each disposed opposite one end of the actuatable elements aforesaid; a backing plate secured to the flywheel for rotation therewith; a plurality of radially disposed releasing levers operably disposed between the backing plate and one of the clutch members for effecting normal disengagement of the clutch members when acted on by said power means; a plurality of normally preloaded compression springs operably disposed between the backing plate and said one clutch member for urging the clutch members into engagement with each other; a portion on said one clutch member engageable by the other end of the actuatable elements whereby relative rotation of the ring gear with respect to the flywheel causes the camming surfaces to actuate the actuatable elements thereby disengaging the clutch members; a depression adjacent the surface termination of each of the camming surfaces for engagement by the one end of each of the actuatable elements upon disengagement of the clutch members, under influence of the clutch engaging springs and prior to the power means taking over control of said clutch members for releasably locking the ring gear and flywheel in engine starting position wherein the relative movement therebetween is taken up; normally preloaded spring means operably incorporated between the ring gear and flywheel for urging the ring gear toward its normally reset position wherein its relative movement with respect to the flywheel is re-established; and an electrical control circuit including a source of electrical energy and a driver-operated switch for interconnecting said source and said motor, thereby causing energization of the starting motor.

5. In controlling mechanism for a clutch effective when engaged to transmit torque produced by an engine having a starting motor and accelerator mechanism, means for normally disengaging the elements of the clutch and controlling their re-engagement, means responsive to the engine starter for disengaging the clutch elements independently of the first-mentioned means, an electrical control circuit including a source of electrical energy and a personally-controlled switch for interconnecting said source and said motor, thereby causing the starting motor to be energized, and a control device for controlling said first-mentioned means in response to release of said accelerator mechanism to effect normal disengagement of said clutch elements, and to depressing said accelerator mechanism in an engine accelerating direction to effect the normal control of re-engagement of said elements, after the engine is started.

6. In controlling mechanism for a clutch associated with an engine having a starting motor and accelerator mechanism, means controlled by release of the accelerator mechanism for disengaging the elements of the clutch and by depressing the accelerator mechanism in an engine accelerating direction for effecting the control of reengagement of the elements, auxiliary disengaging means for disengaging said clutch elements and actuatable by the starting motor prior to cranking the engine, and electrical control circuit including a source of electrical energy and a personally-controlled switch for interconnecting said source and said motor, thereby causing the starting motor to be energized.

7. In a clutch control, the combination with an engine-driven friction clutch including rotatable driving and driven elements engageable for the transmission of torque, spring-operated means for engaging said elements, and power-operated means for normally disengaging and controlling the re-engaging of said elements, in opposition to said spring-operated means; of an engine starting motor, auxiliary disengaging means for disengaging said clutch elements and actuatable by the starting motor prior to cranking the engine, and an electrical control circuit including a source of electrical energy and a personally-controlled switch for interconnecting said source and said motor, thereby causing the starting motor to be energized.

8. In a power-controlled clutch mechanism comprising: a starting motor, an engine-driven flywheel; accellerator mechanism for controlling the engine; driving and driven clutch members frictionally engageable for transmitting engine-torque to an associated shiftable change-speed transmission including interengageable elements which resist disengagement when under torque-load with the clutch members engaged; a spring-loaded ring gear carried by the flywheel and operable relatively thereto in opposition to the spring load; a plurality of pin and slot connections between the ring gear and flywheel defining the limit of said relative movement therebetween; a plurality of circumferentially equally spaced camming surfaces provided on the ring gear; a corresponding number of slidable pins carried by the flywheel for transmitting thrust force of the camming surfaces to the driving member to disengage the same from the driven member; a depression in the normal surface of the ring gear adjacent the termination of each of the camming surfaces for engagement by one end of each of the slidable pins to releasably lock the driving member in disengaged position prior to normal power control being restored to the clutch members; and a plurality of radially disposed release levers operably incorporated between the driving member and flywheel for normally controlling the disengaging and re-engaging of the clutch members in response to operating the ring gear relatively to the flywheel by said starting motor to enable cranking of the engine thereby; a clutch motor energizable to operate said release levers responsive to operation of the engine to take over the disengaged condition of the clutch members whereby the ring gear is released to automatically reset under influence of its spring load out of interference with normal operation of the clutch motor; and an electrical circuit including a source of electrical energy and a personally-operated switch for interconnecting said source and said starting motor, thereby causing the latter motor to be energized.

9. In control means for friction clutches having a driving member and a driven member movably engageable for co-rotation in full drive torque transmitting relation, and separable to interrupt transmission of driving torque from an associated internal-combustion engine controlled by an actuatable throttle control for varying torque production of said engine: means biasing said clutch members into engagement; energizable power means operable in opposition to said biasing means for separating said clutch members; means for energizing said power means; control means responsive to initial actuation of said throttle control in an engine accelerating direction to disable said power means, thereby accommodating controlled movement of said clutch members into engagement with each other under the influence of said biasing and control means; an engine flywheel; a ring gear relatively rotatable on said flywheel; means incorporated between the flywheel and ring gear for defining the limit of said relative rotation therebetween; actuatable means controlled by said relative rotation of the ring gear for acting on the driving member to separate it from the driven member; an electric starting motor having a rotatable pinion meshable with the ring gear upon energization of said motor for sequentially actuating the ring gear relatively to the flywheel to separate the clutch members and rotating the engine to start the same; and an electrical control circuit including a source of electrical energy and a personally-operable switch operable to closed position for interconnecting the source and the motor, thereby causing the starting motor to be operatively energized.

10. A friction clutch control according to claim 9 including additional means incorporated in the control means and effective in response to actuating said throttle control to a position defining substantially the beginning of the aforesaid initial actuation thereof, for rendering the means for energizing the power means effective to cause energization of the said power means to separate the clutch members against the force of the biasing means.

11. A friction clutch control according to claim 10 including retarding means incorporated in the control means and effective in response to disabling said power means to controllably oppose the force of the biasing means to retard the rate of movement of said clutch members into initial engagement.

12. In internal-combustion engines comprising: a crankshaft mounted flywheel, a starting motor, actuatable throttle control for varying the drive torque production of said engine, a friction clutch having driving and driven members operably incorporated on the flywheel, said clutch members being movably engageable for co-rotation in full drive torque transmitting relation, and separable to interrupt transmission of driving torque from said engine: means biasing said clutch members together; energizable power means operable in opposition to said biasing means, for separating said clutch members and for assisting in their re-engagement; control means responsive to initial actuation of said throttle control in an engine accelerating direction to cause the power means to be disabled, thereby accommodating controlled movement of the clutch members into engagement with each other under influence of joint action of the biasing and control means; a ring gear relatively rotatable on said flywheel; means incorporated between the flywheel and ring gear for defining the limits of said relative movement therebetween; actuatable means controlled by said relative rotation of the ring gear for acting on the driving member to separate it from the driven member thereby interrupting transmission of driving torque from the engine; drive mechanism including a pinion rotated by the starting motor for meshing with the ring gear to effect rotation thereof whereby the actuatable means is actuated to separate the clutch members prior to rotating the flywheel to start the engine; a control circuit for the starting motor including a source of energy and a personally-operated device for connecting said source to said motor, thereby causing operative energization of the starting motor.

13. An internal-combustion engine according to claim 12 including a power shaft driven by the driven member of the clutch and extending into a selective drive gearbox, said gearbox having interengageable rotatable elements for varying the gear ratio between the power shaft and a powertake-off shaft, and means for selectively engaging said rotatable elements when the clutch members are separated.

14. In an automotive power-transmitting system including an internal-combustion engine controllable by a throttle responsive to an operatable accelerator pedal having two extreme positions, said engine being equipped with a starting motor and mechanism for operatively impressing drive torque on a driven member of a friction clutch to actuate the same relatively to and co-rotationally with said mechanism to transmit said torque at different efficiencies to a selective change-speed transmission; means for operating said mechanism; an energizable clutch-actuator; control means including an element movable to two operating positions for controlling energization of the clutch-actuator in response to operating the accelerator pedal to and from one of its extreme positions, said energization being interrupted in response to operating the accelerator from said extreme position; means for operating said mechanism; means operatively connecting said operating mechanism with said clutch-actuator for controlling operation of said operating mechanisr; an engine flywheel; a ring gear rotatably mounted on the flywheel for relative and co-rotation with respect thereto; means incorporated between the flywheel and ring gear for defining the limits of said relative movement therebetween; actuatable means carried by the flywheel and acted on by the ring gear during relative rotation thereof to interrupt transmission of drive torque to the clutch driven member; a drive mechanism including a pinion rotated by the starting motor for meshing with the ring gear to effect rotation thereof whereby the actuatable means is actuated prior to co-rotation of the ring gear and flywheel to start the engine; a control circuit for the starting motor including a source of energy and a personnally-controlled device for interconnecting said source and said motor, thereby causing the starting motor to be operatively energized.

15. An internal-combustion engine according to claim 14 in which the friction clutch additionally comprises: a clutch housing, a clutch cover secured to the flywheel for rotation therewith within the clutch housing; a movable driving pressure plate carried by the cover; a plurality of clutch release levers pivotally mounted between the cover and pressure plate for controlling movement of the latter; a plurality of normally preloaded compression springs operably disposed between the cover and pressure plate for urging the latter into engagement with the driven member aforesaid for transmitting drive torque thereby to said change-speed transmission; a clutch throw-out bearing for acting on the free ends of the release levers; a clutch driven shaft encircled by the said throw-out bearing, connected to the driven member.

16. An internal-combustion engine according to claim 15 in which the clutch-actuator comprises: a reciprocable piston mounted in a cylindrical housing rigid with the clutch housing, said piston when energized acting on the throw-out bearing to separate the pressure plate via said release levers in opposition to the force exerted by the compression springs aforesaid; a hydraulic pressure chamber provided between the cylindrical housing and piston; a hydraulic pressure line leading to said pressure chamber; and a source of hydraulic pressure production for applying hydraulic pressure through the pressure line via the pressure chamber to actuate the piston to separate the pressure plate from the clutch driven member.

17. An internal-combustion engine according to claim 16 in which the change-speed transmission comprises: a plurality of interengageable relatively rotatable elements for establishing a plurality of forward speed drives and a reverse speed drive; and manually-operable mechanism including a hand-lever for selectively engaging said elements.

18. An internal-combustion engine according to claim 16 in which the source of hydraulic pressure production is a gear-type pump driven from the engine having a source of liquid supply, a suction line from the liquid supply to the pump, a pressure line leading from the opposite side of the pump; and a pressure regulating valve incorporated between the pressure line and the liquid supply.

19. An internal-combustion engine comprising: a crankshaft mounted flywheel, a starting motor, and an actuatable throttle control for varying the driving torque production transmitted via a friction clutch having a movable driving member, a driving member carried by the flywheel, and a driven member connected via a drive shaft to a manually-selective change-speed gearbox: a clutch housing within which the flywheel and clutch rotate; a plurality of release levers pivotally mounted between the two driving members; a plurality of normally preloaded compression springs reacting on the two driving members to bring the movable driving member into frictional engagement with the driven member; a hydraulic actuator concentrically disposed about the clutch drive shaft, said actuator having outer and inner cylindrical walls interconnected at one end to a vertical wall rigid with the clutch housing; a ring-type cavity provided between said cylindrical walls; a ring-type piston reciprocably mounted in said cavity; a hydraulic pressure chamber provided between one end of the piston and vertical wall aforesaid; a circular extension projecting integrally from the other end of the piston; a clutch throw-out bearing mounted on said extension for reciprocable movement therewith and relatively rotatable with respect thereto, said bearing engaging the free ends of the release levers and acting thereon to withdraw the movable driving member from the driven member aforesaid when the hydraulic actuator is energized; an internal annular groove provided adjacent the open end of the outer cylindrical wall; a split-type retainer ring engaging said annular groove for abutment by the piston to limit the actuating stroke thereof; a ring gear relatively rotatable on the flywheel; thrust and retaining means carried by the flywheel to limit relative rotation of the ring gear and to maintain the latter in thrust transmitting relationship with respect to the flywheel; actuatable means carried by the flywheel; a plurality of radially projecting elements integral with the peripheral portion of the movable driving member acted on by said actuatable elements; a corresponding number of openings in the flywheel carried driving member through which the projecting elements extend; a plurality of extensions integral with the outer face portion of the movable driving member to which the release levers are pivoted and which project through the aforesaid openings in the flywheel driving member to provide co-rotational movement of the two driving members and accommodate axial relative movement therebetween; cam means having a plurality of working surfaces in the face of the ring gear for acting on the actuatable elements to move the movable driving member out of engagement with the driven member in response to relative movement of the ring gear; a plurality of normally preloaded compression springs operably carried by the ring gear between the thrust and retaining means and flywheel for opposing relative rotation of the ring gear; a plurality of depressions adjacent the terminating ends of the working surfaces on the cam means for reception of a portion of the actuatable elements under influence of the clutch-engaging springs aforesaid via the movable driving member to releasably lock the ring gear in its relative disposition with respect to the flywheel, said actuatable elements being releasable automatically from said cooperating depressions when the movable driving member is additionally moved from the driven member in response to energization of the hydraulic actuator, whereby the actuatable elements are retracted to a noninterfering position with respect to the normal control of the clutch members by the hydraulic actuator; an electrical control circuit for said starting motor including a source of electrical energy and a personally-controlled switch device operable to closed position interconnecting the motor and the source, thereby causing the starting motor to be energized; and drive mechanism having a pinion rotated by the starting motor for engagement with the ring gear to rotate the latter relatively and in unison with said flywheel to sequentially effect disengagement of the clutch members and start the engine.

20. An internal-combustion engine according to claim 19 in which the hydraulic actuator piston comprises: a pair of longitudinally spaced inner and outer channels; a pliant annular seal engaging each of said channels; a pair of inner and outer circularly aligned liquid channels between said first-mentioned pair of channels; an interconnecting liquid passageway between said circularly aligned channels; a pressure line leading to said piston via the hydraulic pressure chamber; and a drain line leading from said circularly aligned channels to return leak-by liquid to a source of liquid supply; and a source of hydraulic pressure production receiving liquid from said supply for transmitting liquid under pressure to the hydraulic pressure chamber aforesaid to energize said piston.

21. In an automotive clutch for transmitting torque produced by an engine having a self-starter and friction elements co-rotatable, respectively, with an engine flywheel member and a change-speed transmission input member, each of said elements being coaxial with its respective member and one of said elements being shiftable axially relatively to its member; the improvements of means accommodating limited relative rotation of said members upon operation of said starter despite initial engagement of said friction elements, and means actuated by said relative rotation of said members to shift said one of said elements relatively to its said member to separate said friction elements and to accommodate starting of said engine by rotation of said flywheel member despite engaged condition of the transmission.

22. In a normally automatically actuated clutch having friction elements spring-urged into co-rotative engagement and having engine-driven power means for separating the friction elements; the improvements of apparatus for separating the friction elements prior to engine starting, comprising contacting cam surfaces on said friction elements for separating said elements axially upon relative rotation of said elements, an engine starter, means connecting said starter to one of said friction elements to rotate the same relatively to the other of said elements prior to engine starting, and means for actuating said starter including a starter circuit and a personally operable switch.

23. For use with an automobile having a change-speed transmission provided with an input shaft and an engine having a self-starter engageable with an engine flywheel to rotate the same for selectively interconnecting said engine and said transmission and comprising: a first friction element carried by the flywheel for normal co-rotation, means accommodating limited relative rotation of said first element and said flywheel, a second friction element carried by the transmission input shaft coaxially therewith, means accommodating axial displacement of said second element relative to said shaft and said first element, engine-driven power means operable to shift said second element from its normal engagement with said first element, and auxiliary shifting means responsive to starter rotation of said flywheel relative to said first element for shifting said second element axially from engagement with said first element prior to operation of said engine-driven power means.

24. A torque-activatable drive line in which there is an internal-combustion engine provided with a rotatable torque output member and an energizable device for rotating said output member to start the engine, which drive line includes frictionally-engageable driving and driven members for transmitting drive torque from said engine when engaged, to move a work-load, the combination of: a rotatable element operatively associated with said output member and adapted to have limited relative rotation with respect to said latter member prior to co-rotation therewith to start the engine; normally spaced engageable portions disposed respectively on the output member and said rotatable element to define said limited relative rotation of the latter, said portions when engaged effecting co-rotational movement of said output member and said rotatable element when the latter is rotated; spring means including a normally preloaded spring reacting between said portions to oppose relative rotation of said rotatable element from normal position; mechanism interconnecting said rotatable element and one of said frictional members for actuation in response to relative rotation of said rotatable element to disengage said frictional members prior to co-rotational movement of said rotatable element and said output member to start the engine; and personally-operable means for controlling energization of said starting device to effect rotation of said rotatable element.

25. A torque-activatable drive line constructed in accordance with claim 24 wherein said interconnecting mechanism includes means operative to maintain said frictional members disengaged notwithstanding said starting device is de-energized upon effecting disengagement of said frictional members in the manner described.

26. In an automotive drive line, an engine, a flywheel for said engine, a pair of interengageable friction clutch elements, one of said clutch elements being co-rotative with said flywheel, engine starting means including an energizable motor for rotating said flywheel and said one clutch element, a change-speed transmission having an input shaft co-rotative with the other of said clutch elements; and means operatable to accommodate starting of the engine despite interengagement of said clutch elements including mechanism actuatable by said starting motor prior to initial rotation of said flywheel thereby, to disengage said clutch elements thereby releasing said flywheel for subsequent rotation by said starting motor to start said engine.

References Cited in the file of this patent
UNITED STATES PATENTS

| | | |
|---|---|---|
| 1,978,523 | Davis | Oct. 30, 1934 |
| 2,091,269 | Colman | Aug. 31, 1937 |
| 2,437,121 | Petersen | Mar. 2, 1948 |
| 2,916,031 | Parsons | Dec. 8, 1959 |

UNITED STATES PATENT OFFICE
CERTIFICATION OF CORRECTION

Patent No. 2,969,052                        January 24, 1961

Glenn T. Randol

It is hereby certified that error appears in the above numbered patent requiring correction and that the said Letters Patent should read as corrected below.

Column 1, line 21, for "autoclave" read -- automotive --; column 8, line 51, for "subjacent" read -- adjacent --; column 9, line 48, for "spring" read -- springs --; column 10, line 8, for "the with-" read -- the existent with- --; column 12, line 29, for "counter-shaft" read -- countershaft --; column 19, lines 24 and 25, strike out "means for operating said mechanism;".

Signed and sealed this 29th day of August 1961.

(SEAL)
Attest:

ERNEST W. SWIDER                              DAVID L. LADD
Attesting Officer                                 Commissioner of Patents